United States Patent
Shintani et al.

(10) Patent No.: US 9,325,908 B2
(45) Date of Patent: Apr. 26, 2016

(54) IMAGE-CAPTURING APPARATUS INCLUDING SHUTTER UNIT WITH PRE-DRIVING OPERATION

(71) Applicant: PANASONIC INTELLECTUAL PROPERTY MANAGEMENT CO., LTD., Osaka (JP)

(72) Inventors: Dai Shintani, Osaka (JP); Takahiro Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/526,494

(22) Filed: Oct. 28, 2014

(65) Prior Publication Data

US 2015/0124146 A1 May 7, 2015

(30) Foreign Application Priority Data

Nov. 6, 2013 (JP) ................................. 2013-230024
Sep. 26, 2014 (JP) ................................. 2014-197574

(51) Int. Cl.
*H04N 5/235* (2006.01)
*H04N 5/232* (2006.01)
*H04N 5/225* (2006.01)

(52) U.S. Cl.
CPC ........... *H04N 5/2353* (2013.01); *H04N 5/2254* (2013.01); *H04N 5/23245* (2013.01); *H04N 5/23293* (2013.01)

(58) Field of Classification Search
CPC .................................................. H04N 5/2353
USPC ........................................................ 348/362
See application file for complete search history.

(56) References Cited

U.S. PATENT DOCUMENTS

| 2006/0152817 | A1* | 7/2006 | Noto ....................... G02B 1/105 359/692 |
| 2007/0242950 | A1 | 10/2007 | Tenmyo |
| 2008/0084486 | A1* | 4/2008 | Enge ..................... H04N 5/3696 348/239 |
| 2008/0211922 | A1* | 9/2008 | Murashima .............. G03B 5/02 348/208.99 |
| 2008/0259200 | A1 | 10/2008 | Matsumoto |
| 2009/0213233 | A1* | 8/2009 | Kido ....................... G03B 7/093 348/208.4 |
| 2009/0231450 | A1* | 9/2009 | Tanaka ..................... G03B 5/02 348/208.7 |
| 2011/0164871 | A1* | 7/2011 | Shintani ................... G03B 9/40 396/484 |
| 2011/0176799 | A1* | 7/2011 | Shintani ................... G03B 9/14 396/484 |
| 2011/0234892 | A1* | 9/2011 | Yasuda ................ H04N 5/2252 348/374 |

FOREIGN PATENT DOCUMENTS

| JP | 2007-286443 A | 11/2007 |
| JP | 2008-205619 A | 9/2008 |
| JP | 2012-123136 A | 6/2012 |

* cited by examiner

*Primary Examiner* — Usman Khan
(74) *Attorney, Agent, or Firm* — McDermott Will & Emery LLP

(57) ABSTRACT

An image-capturing apparatus includes an image-capturing device having an image-capturing surface, a shutter unit having an aperture configured to allow light from an object to pass through the aperture, and a controller that controls the shutter unit. The shutter unit includes a curtain unit that selectively executes an opening operation of opening the aperture and a closing operation of closing the aperture, and an actuator that drives the curtain unit. The controller is operable to control the shutter unit to execute: an image-capturing operation in which the shutter unit executes the closing operation after resetting an electric charge stored in the image-capturing device; and a pre-driving operation in which the actuator drives the curtain with a small motion before executing the image-capturing operation.

9 Claims, 13 Drawing Sheets

IMAGE-CAPTURING APPARATUS INCLUDING SHUTTER UNIT WITH PRE-DRIVING OPERATION

RELATED APPLICATIONS

This application claims the benefit of Japanese Application No. 2013-230024, filed on Nov. 6, 2013 and Japanese Application No. 2014-197574, filed on Sep. 26, 2014, the disclosures of which Applications are incorporated by reference herein.

TECHNICAL FIELD

Techniques disclosed herein relate to an image-capturing apparatus.

BACKGROUND ART

Japanese Patent Laid-Open Publication No. 2008-205619 discloses an image-capturing apparatus which can remove a foreign matter, such as dust, which is attached onto an optical system disposed in front of an image-capturing device.

SUMMARY

An image-capturing apparatus includes an image-capturing device having an image-capturing surface, a shutter unit having an aperture configured to allow light from an object to pass through the aperture, and a controller that controls the shutter unit. The shutter unit includes a curtain unit that selectively executes an opening operation of opening the aperture and a closing operation of closing the aperture, and an actuator that drives the curtain unit. The controller is operable to control the shutter unit to execute: an image-capturing operation in which the shutter unit executes the closing operation after resetting an electric charge stored in the image-capturing device; and a pre-driving operation in which the actuator drives the curtain with a small motion before executing the image-capturing operation.

The image-capturing apparatus can capture an object image with a proper exposure time.

DETAIL DESCRIPTION OF PREFERRED EMBODIMENTS

Description is provided hereinafter in detail of an exemplary embodiment by referring to the accompanying drawings as needed. There may be cases, however, that certain details are omitted when deemed more than necessary. Those cases where the details will be omitted include, for instance, descriptions of such matters that have hitherto been known well, and duplicate descriptions of substantially similar structures. The purpose of this is to avoid the following descriptions from becoming needlessly redundant, and to make them easily understandable to those skilled in the art.

While the inventor(s) provides the accompanying drawings and the following descriptions to help those skilled in the art appreciate the present disclosure, they are not intended to limit the scope of the invention as indicated by the appended claims.

EXEMPLARY EMBODIMENT

1-1. General Outline of Camera System 100

Figure 1:
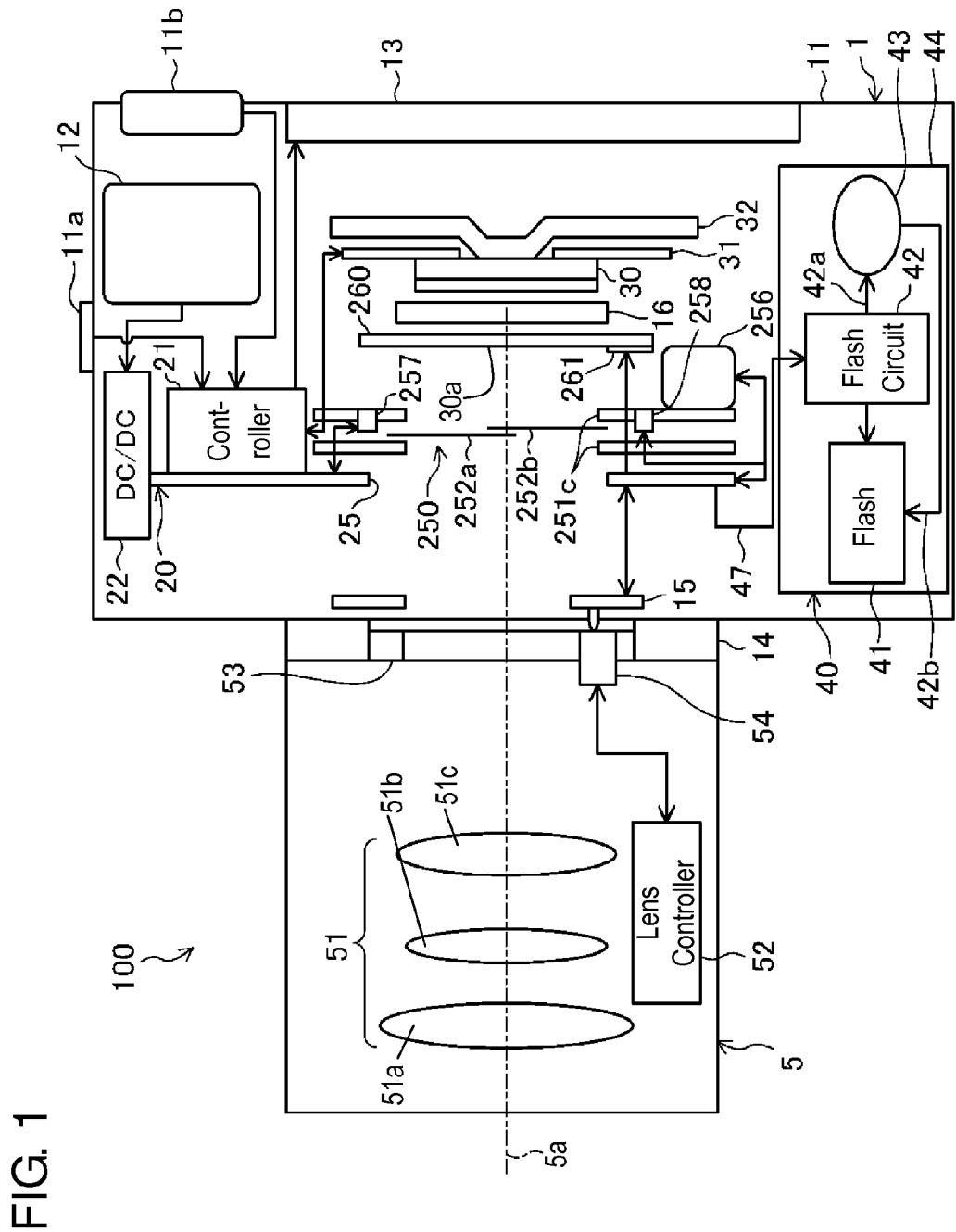
FIG. 1 is a block diagram of a camera system according to an exemplary embodiment.

FIG. 1 is a block diagram of camera system 100 according to an exemplary embodiment. Camera system 100 is a camera having interchangeable lenses. Camera system 100 includes camera body 1 and interchangeable lens 5 that is detachably mounted to camera body 1. Camera body 1 is an image-capturing apparatus.

Figure 2:
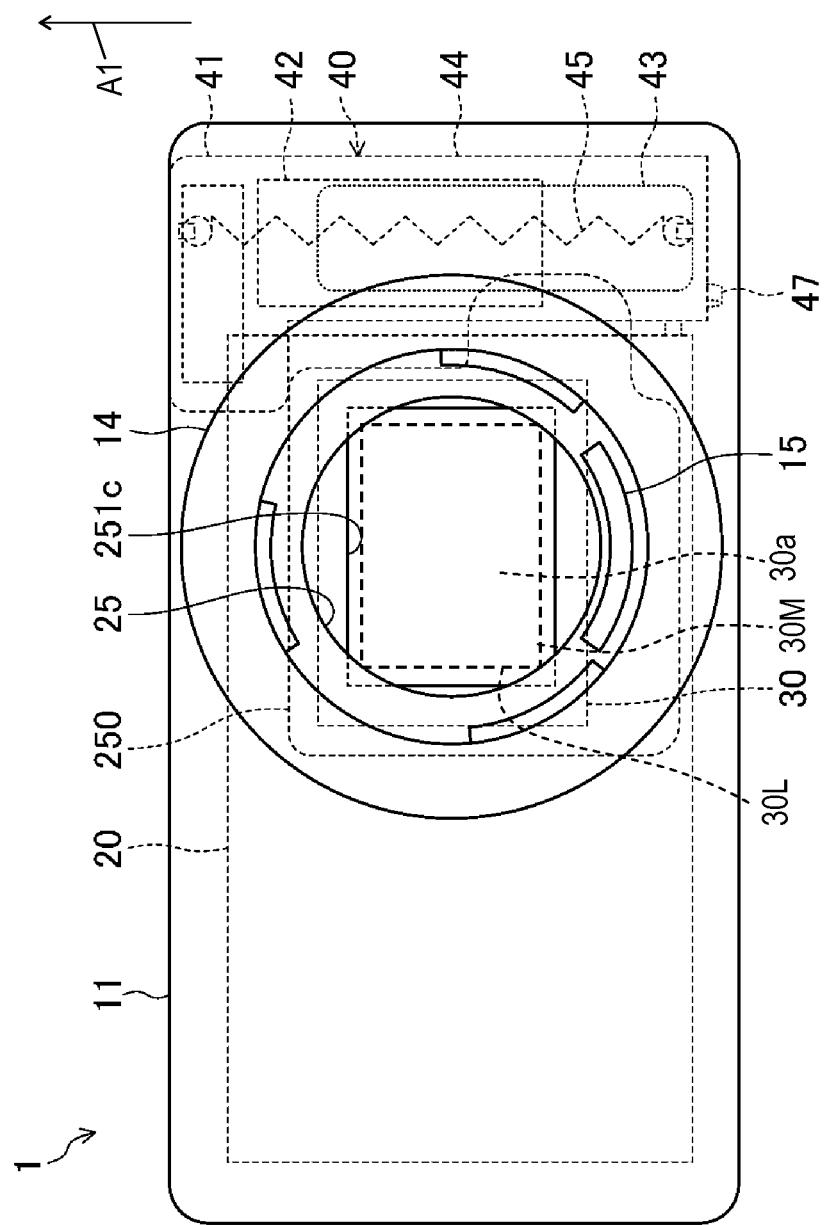
FIG. 2 is a front view of a camera body of the camera system according to the embodiment.

FIG. 2 is a front view of camera body 1. Camera body 1 is a so-called mirror less camera that does not have a mirror box unit.

Camera body 1 includes exterior cover 11, battery 12, display device 13, body mount 14, body-side contact 15, main circuit board 20, mechanical shutter 250, CMOS image sensor 30, CMOS circuit board 31 and a circular opening 25. For the convenience of descriptions, an orientation of camera body 1 to direct arrow A1 shown in FIG. 2 vertically upward is defined as a normal orientation. A side of camera body 1 facing an object is referred to as "front". A side of camera body 1 opposite to the object is referred to as "back". A side of camera body 1 in the normal orientation facing vertically upward is referred to as "upper". A side of camera body 1 facing vertically downward is referred to as "bottom". A left side of camera body 1 in the normal orientation viewing from the object is referred to as "left". A right side of camera body 1 viewing from the object is referred to as "right". These terms, such as "front", "back", "top", "bottom", "right" and "left", the indicate directions merely indicate relative directions depending only on relative positions of components, such as camera body 1 and interchangeable lens 5, of camera system 100 and the object, and do not indicate absolute directions, such as a vertical direction.

Exterior cover 11 constitutes an exterior of camera body 1. Exterior cover 11 has substantially a rectangular parallelepiped shape. Shutter button 11a is disposed on exterior cover 11. Shutter button 11a is a two-step switch that operates at a half-stroke pressing in which the button is pressed along about a half of a full stroke of the button and at a full-stroke pressing in which the button is pressed along the full stroke. For instance, an automatic focus function is executed when shutter button 11a is pressed halfway, and then, an image is captured when shutter button 11a is pressed fully. Display device 13 and control button 11b for a user to make various control settings are disposed on a back surface of exterior cover 11.

Body mount 14 is disposed on a front surface of exterior cover 11. Body-side contact 15 is disposed adjacent to body mount 14, as shown in FIG. 2. Interchangeable lens 5 is mounted to body mount 14 with a bayonet coupling. In other words, body mount 14 detachably retains interchangeable lens 5. At this moment, lens-side contact 54 is electrically connected to body-side contact 15. Data and/or control signal can be transmitted between camera body 1 and interchangeable lens 5 via body-side contact 15 and lens-side contact 54. Body-side contact 15 may be disposed on body mount 14.

Exterior cover 11 accommodates battery 12, main circuit board 20, CMOS image sensor 30, and CMOS circuit board 31 therein.

Interchangeable lens 5 includes lens group 51, a lens driver for driving lens group 51, lens controller 52, lens mount 53 to be coupled to camera body 1, and lens-side contact 54, as shown in FIG. 1. Lens group 51 includes zoom lens 51a, focus lens 51b, and lens 51c related to image stabilization. Lens group 51 has optical axis 5a. Lens group 51 forms an image of the object on image-capturing surface (light-receiving surface) 30a of CMOS image sensor 30.

Interchangeable lens 5 is mounted to camera body 1 with lens mount 53. At this moment, lens-side contact 54 is electrically connected to body-side contact 15 of camera body 1. Lens controller 52 controls the les driver.

1-2. Structure of Camera Body 1

CMOS image sensor 30 converts an optical image formed on image-capturing surface 30a into an electric image signal. CMOS image sensor 30 is an image-capturing device. The image-capturing device may be, e.g. a CCD image sensor. CMOS image sensor 30 has an electronic shutter function. More specifically, CMOS image sensor 30 functions as a rolling shutter. When functioning as a rolling shutter, CMOS image sensor 30 groups one to several scanning raster lines into each block, starts storing electric charges in all of pixels in each block simultaneously, and ends storing electric charges simultaneously.

A circuit that controls CMOS image sensor 30 in mounted to CMOS circuit board 31. CMOS circuit board 31 can execute a predetermined process, such as analog-to-digital conversion, on the image data from CMOS image sensor 30. CMOS image sensor 30 is mounted on CMOS circuit board 31.

Display device 13 has a liquid crystal display. Display device 13 displays images corresponding to image data for display. The image data for display includes image data that has been processed, data of, e.g. image-capturing conditions and operating menu of camera body 1. Display device 13 can display moving images and still images selectively. Display device 13 can display a viewing image, namely, a live-view image, of the object. Display device 13 is a display unit.

The display unit may be implemented by any device, such as an EL display, an inorganic EL display, or a plasma display panel, that can display images. Display device 13 may be disposed on a side surface, an upper surface or any other place of exterior cover 11, instead of the back surface of exterior cover 11.

Mechanical shutter 250 executes an opening operation to open aperture 251c and a closing operation to close aperture 251c selectively with single curtain unit 252, and can function as either one of front curtain and rear curtain selectively.

Controller 21 having an IC is mounted onto main circuit board 20. Controller 21 controls whole camera body 1, such that it controls camera body 1 when taking pictures, for instance. Controller 21 can be constructed physically into any configuration as long as controlling camera system 100 or camera body 1. Main circuit board 20 is a circuit board.

1-3. Structure of Mechanical Shutter

Figure 3:
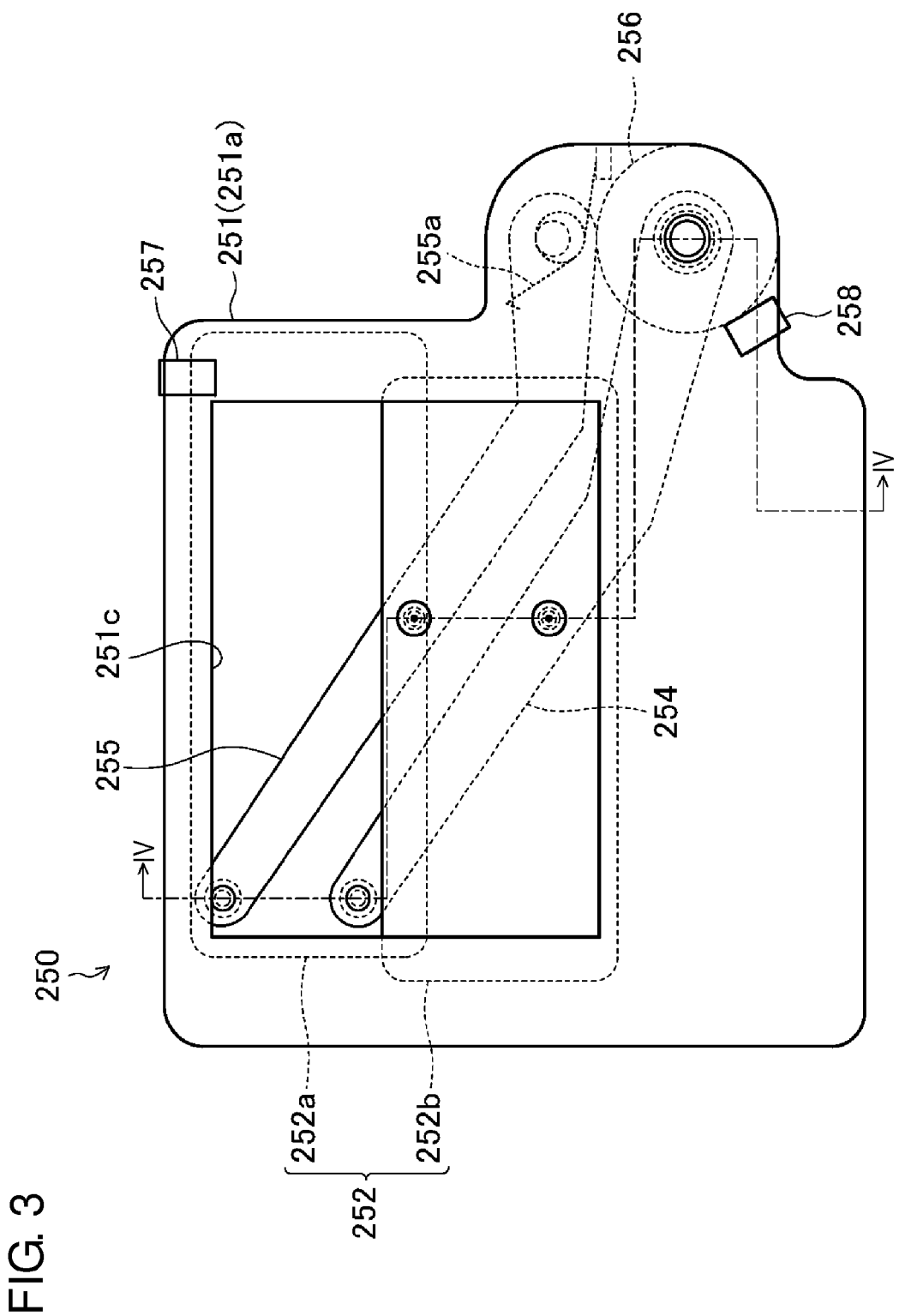
FIG. 3 is a front view of a mechanical shutter of the camera system according to the embodiment which closes.
Figure 4:
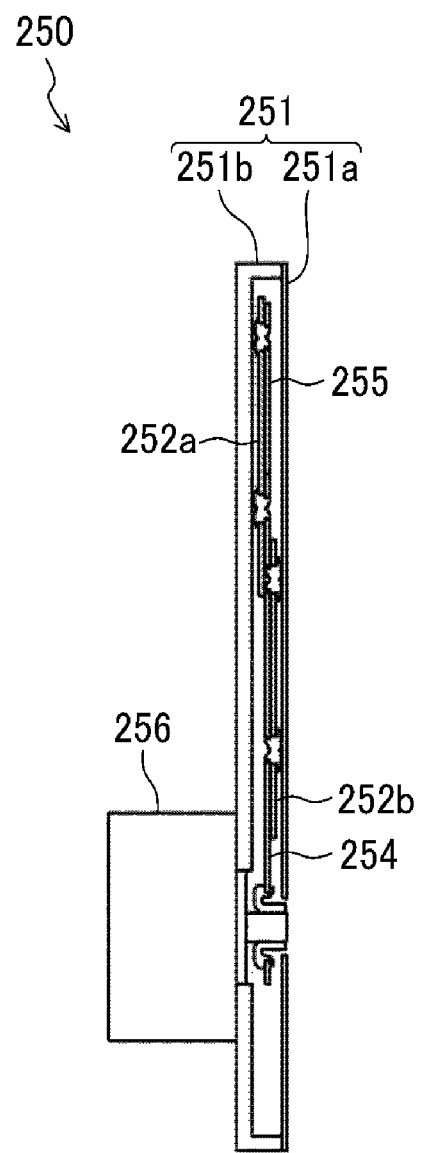
FIG. 4 is a cross-sectional view of the mechanical shutter at line IV-IV shown in FIG. 3.
Figure 5:
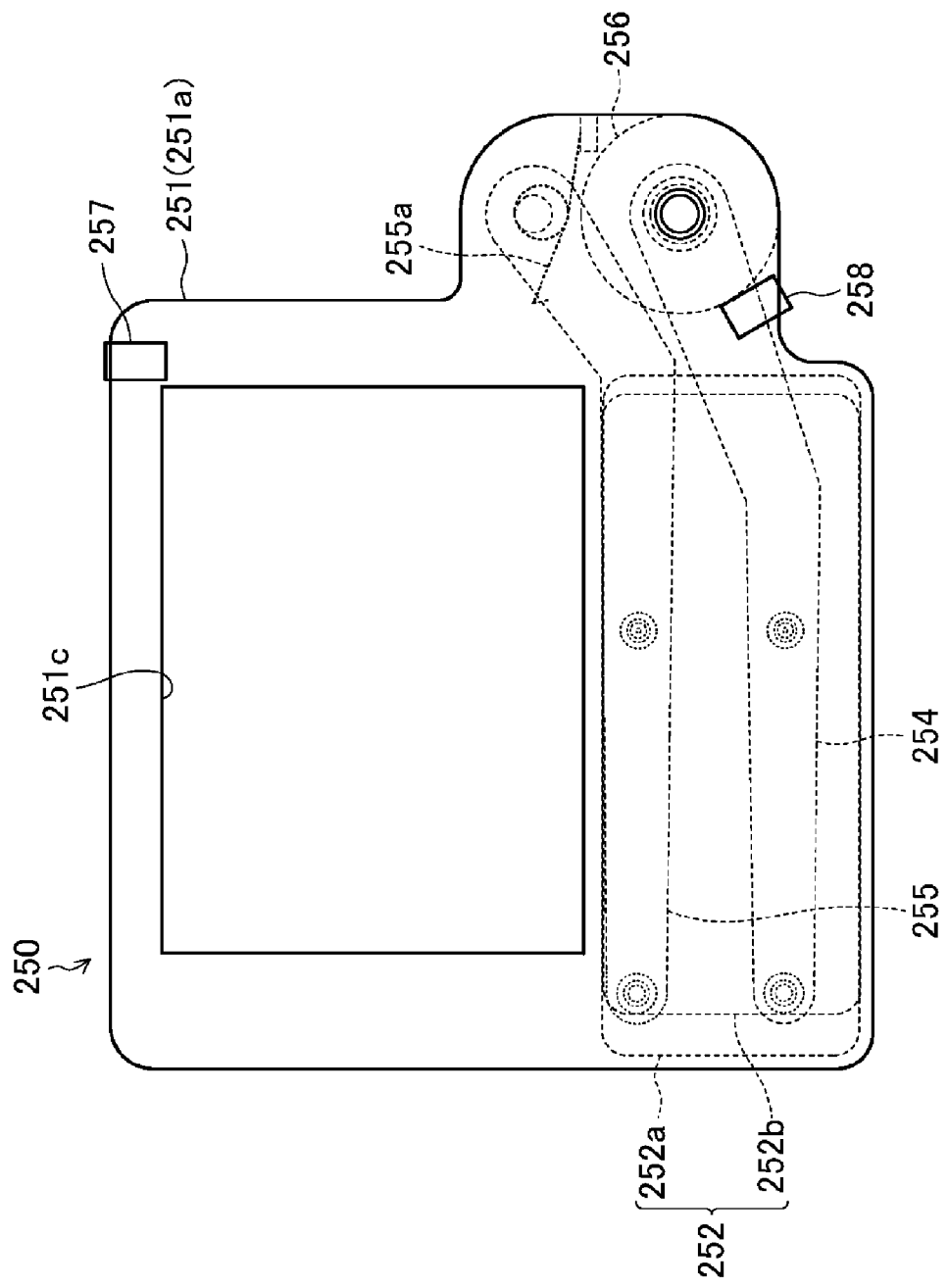
FIG. 5 is a front view of the mechanical shutter according to the embodiment which opens.

FIG. 3 is a front view of mechanical shutter 250 which closes. FIG. 4 is a cross-sectional view of mechanical shutter 250 at line IV-IV shown in FIG. 3. FIG. 5 is a front view of mechanical shutter 250 which opens.

Mechanical shutter 250, the shutter unit, selectively executes an opening operation for opening aperture 251c and a closing operation for closing aperture 251c, with the single curtain unit. Upon executing a shuttering function, for instance, mechanical shutter 250 functions selectively as either one of a front curtain and a rear curtain. That is, mechanical shutter 250 opens and closes aperture 251c without a slit formed with a focal plane shutter having a front curtain and a rear curtain. Mechanical shutter 250 includes cover 251, curtain unit 252, driving arm 254, trailing arm 255, stepping motor 256, closing-detection switch 257, and opening-detection switch 258. Curtain unit 252 includes blades 252a and 252b. Mechanical shutter 250 is the shutter unit having aperture 251c therein. Blades 252a and 252b of curtain unit 252 are driven by two arms, i.e., driving arm 254 and trailing arm 255.

Cover 251 includes front cover 251a and rear cover 251b, and has a plate shape. Cover 251 accommodates blades 252a and 252b, driving arm 254, trailing arm 255, closing-detection switch 257 and opening-detection switch 258 between front cover 251a and rear cover 251b. Cover 251 has aperture 251c therein having a rectangular shape. Aperture 251c is formed in each of front cover 251a and rear cover 251b. Aperture 251c has a size generally sufficient to avoid interference with the light that passes through interchangeable lens 5 and enters to CMOS image sensor 30. Aperture 251c is formed in an upper area of about ⅔ of cover 251 in the vertical direction. In other words, there is no opening formed in a lower area of about ⅓ of cover 251.

Stepping motor 256 drives driving arm 254 to rotate driving arm 254. Stepping motor 256 is mounted to rear cover 251b at a lower part besides aperture 251c.

Blades 252a and 252b open and close aperture 251c of cover 251. Blades 252a and 252b have a rectangular plate shape. Blades 252a and 252b have sizes sufficient to shut and cover aperture 251c when they are vertically aligned next to each other without producing a space between the blades. Blades 252a and 252b open aperture 251c, and are accommodated within the lower area of about ⅓ of cover 251 while overlapping each other. Blades 252a and 252b can close and open aperture 251c.

One end of driving arm 254 is connected to a rotary shaft of stepping motor 256. That is, driving arm 254 rotates when being driven by stepping motor 256. Blade 252a is rotatably coupled to another end of driving arm 254. Blade 252b is rotatably coupled to a middle portion between the two ends of driving arms 254.

One end of trailing arm 255 is rotatably coupled to rear cover 251b at a part besides aperture 251c and above stepping motor 256. Blade 252a is rotatably coupled to another end of trailing arm 255. In addition, blade 252b is rotatably coupled to a middle portion between the two ends of trailing arm 255. Trailing arm 255 is coupled to blades 252a and 252b at positions above driving arm 254. Blades 252a and 252b, driving arm 254, and trailing arm 255 link with one another to constitute a link mechanism. Trailing arm 255 is urged downward with spring 255a. That is, spring 255a urges the link mechanism in a direction in which blades 252a and 252b is urged to open aperture 251c. Spring 255a is an urging member.

When driving arm 254 is rotated by stepping motor 256, blades 252a and 252b and trailing arm 255 move according to the rotation of driving arm 254. Blades 252a and 252b move between a closing position for closing aperture 251c and an opening position for opening aperture 251c in response to the rotation of driving arm 254. Upon being located at the closing position, blades 252a and 252b are aligned vertically without a space between the blades, and completely close aperture 251c. Upon being located at the opening position, blades 252a and 252b overlap each other and are accommodated in cover 251, and open aperture 251c. Since blades 252a and 252b which are located at the opening position are located below aperture 251c, blades 252a and 252b move from a lower part to an upper part of aperture 251 to close aperture 251c from the lower part to the upper part of aperture 251c.

As described above, spring 255a urges trailing arm 255 downward, and urges link mechanism such that blades 252a and 252b move toward the opening position. This mechanism prevents blades 252a and 252b from moving from the opening position to the closed position even when stepping motor 256 is not energized.

Closing-detection switch 257 detects blades 252a and 252b when located at the closing position (in a close state). Closing-detection switch 257 detects blade 252a, in particular, when blades 252a and 252b are located at the closing position. Closing-detection switch 257 is a closing-state detector.

Opening-detection switch 258 detects blades 252a and 252b when being located at the opening position (in an open state). Opening-detection switch 258 detects trailing arm 255, in particular, when blades 252a and 252b are located at the opening position. Opening-detection switch 258 is an opening-state detector.

Closing-detection switch 257 and opening-detection switch 258 may be implemented by, e.g. optical sensors, such as photo interrupters and photo reflectors, that detect interruption or reflection of light to determine the closing state and the opening state.

Link mechanism having blades 252a and 252b driven by stepping motor 256 provides the mechanical shutter 250 with a small size.

Stepping motor 256 may be replaced with an electromagnetic actuator or an ultrasonic actuator used for, e.g. a meter, a plunger, of a DC motor. Spring 255a may be eliminated depending on a type of the actuator.

1-4. Image-Capturing Operation of Camera Body

An operation of camera body 1 for capturing images will be described below with referring to the accompanying drawings. Controller 21 controls components of camera body 1, and specifically performs the following image-capturing operation.

In mechanical shutter 250 shown in FIG. 3, which is a focal-plane shutter, blades 252a and 252b having the plate shapes overlap each other in a tight space. This configuration may produce a surface force as large as a driving force that moves blades 252a and 252b and apply the surface force among cover 251 and blades 252a and 252b of mechanical shutter 250 when intervals at which mechanical shutter 250 is driven are wider than a predetermined time. In mechanical shutter 250, oil starvation can occur in the rotary shaft of stepping motor 256. These cases deteriorate a starting characteristic of the mechanical shutter, and may produce problems, such as the delay of the start of mechanical shutter 250 when capturing a first photo after being turned on or when a first photo out of consecutive image-capturing immediately after being turned on, and a decrease in the curtain speed.

In camera system 100 according to this embodiment, curtain unit 252 is driven at a small motion to reduce the surface force and to apply oil to the rotary shaft of the stepping motor immediately before driving curtain unit 252 to start exposure so as to solve the above problems.

Figure 6:
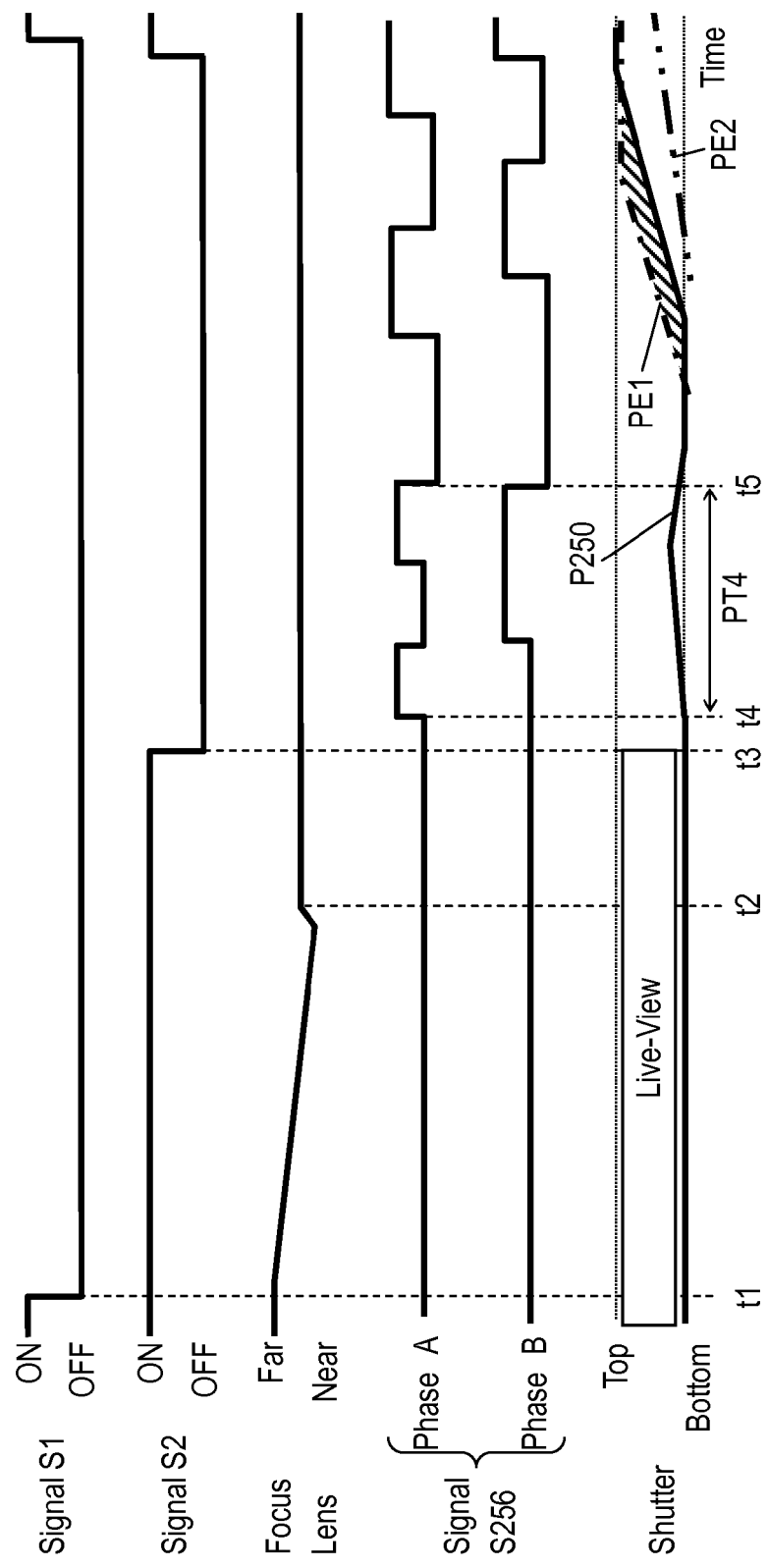
FIG. 6 is a timing chart of an operation of an image-capturing with an electronic front curtain and a mechanical rear curtain of the camera system according to the embodiment.

FIG. 6 is a timing chart of an operation with an electronic front curtain and a mechanical rear curtain of camera system 100 capturing an image according to this embodiment, and shows signals S1 and S2 output from shutter button 11a being activated, the position of focus lens 51b, and the operation of the shutter. FIG. 6 further shows driving signals S256 supplied to stepping motor 256 to drive and rotate stepping motor 256. Signals S256 contains two signals, i.e., a phase-A signal and a phase-B signal.

When shutter button 11a is pressed to a half stroke of the button at time point t1 to cause signal S1 to be an "ON" level, controller 21 executes an automatic focusing ("AF") operation of a contrast type. Simultaneously to this, controller 21 executes photometry on the object and determines an exposure time based on the result of the photometry.

Controller 21 causes display device 13 to display the live-view image obtained by CMOS image sensor 30 until a time when shutter button 11a is pressed to a full stroke of the button to cause signal S2 to be at an "OFF" level.

When shutter button 11a is pressed to the full stroke at time point t3 and outputs signal S2, controller 21 energizes stepping motor 256 by supplying pulse signals S256 such that stepping motor 256 does not completely rotate. To be specific, controller 21 inputs, to stepping motor 256, the two-phase drive pulse signal of about one and half pulses for the phase-A and the phase-B at time point t4, and immediately after that, inputs inverted two-phase drive pulses to stepping motor 256. These pulses input to stepping motor 256 produce a pre-driving operation to drive curtain unit 252 at a small motion in period PT4 from time point t4 to time point t5 in which blades 252a and 252b of curtain unit 252 move slightly from the opening position at time point t4, and return to the opening position at time point t5. The pre-driving operation can reduce the surface force applied to curtain unit 252, and facilitates lubrication of the rotary shaft of stepping motor 256 with oil, thereby enabling curtain unit 252 to move smoothly after time point t5. Subsequently, controller 21 causes CMOS image sensor 30 perform, via CMOS circuit board 31, a shutter operation of the rolling shutter with electronic front curtain PE1. To be specific, controller 21 resets electric charges sequentially from the line on the lower end toward the line on the upper end of CMOS image sensor 30. When a predetermined exposure time has elapsed after the resetting of electric charges, controller 21 activates mechanical shutter 250 and moves blades 252*a* and 252*b* to position P250 to close aperture 251*c*. In other words, mechanical shutter 250 functions as a rear curtain. After blocking light from the object to CMOS image sensor 30, controller 21 reads out the electric charges of CMOS image sensor 30.

Figure 7:
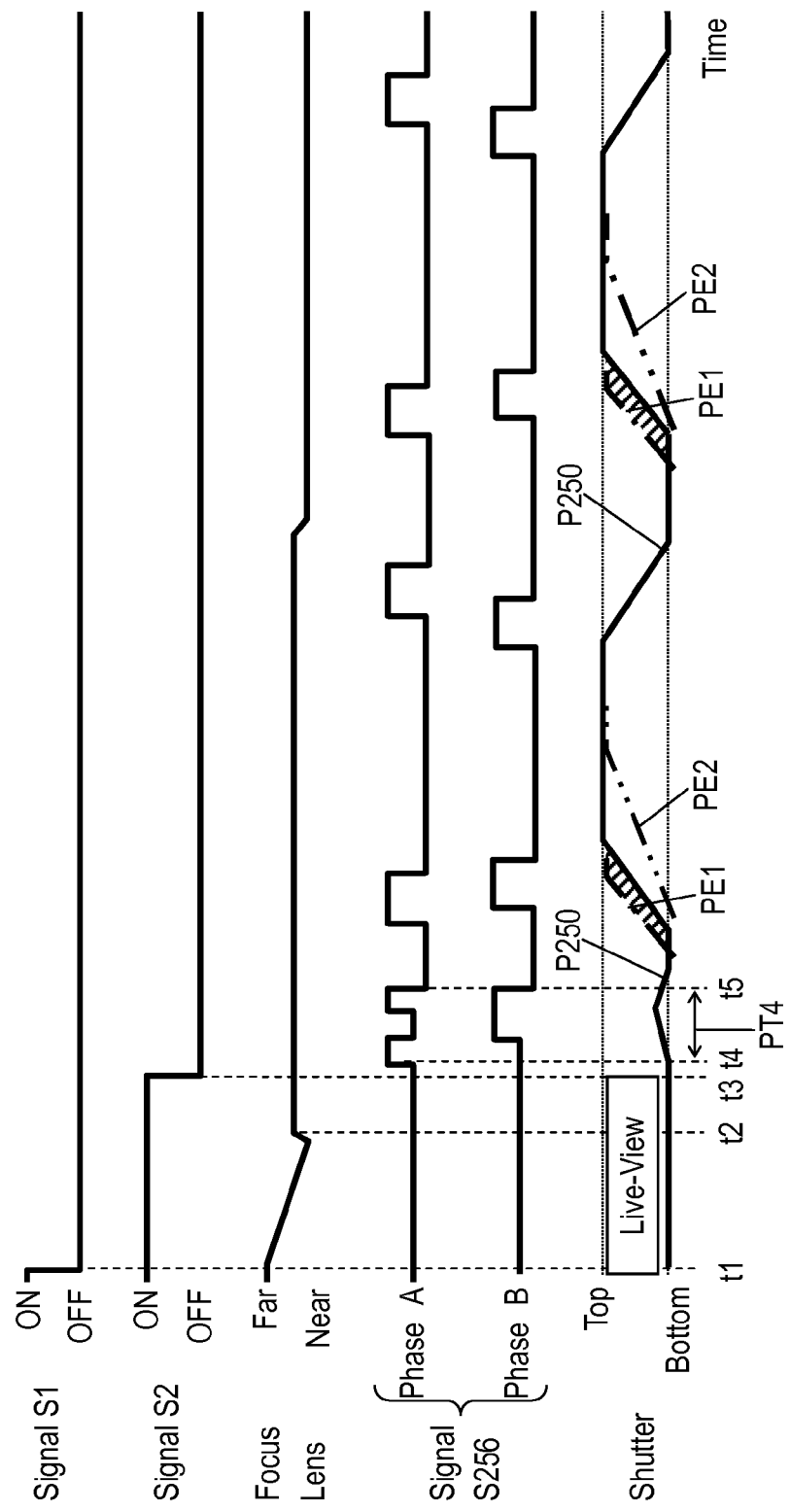
FIG. 7 is a timing chart of an operation of a consecutive image-capturing mode of the camera system according to the embodiment.

FIG. 7 is a timing chart of an image-capturing operation in an image-capturing mode of the camera system according to the embodiment, and similar to FIG. 6, shows signals S1 and S2 output when shutter button 11*a* is activated, a position of focus lens 51*b*, and operation of the shutter. Signals S1 and S2 are output continuously in the consecutive image-capturing mode, since shutter button 11*a* is pressed continuously for the duration of the consecutive image-capturing. For capturing the first image of the consecutive image-capturing, controller 21 executes the pre-driving operation shown in FIG. 6, and after that, captures the image with electronic front curtain PE1 and the mechanical rear curtain. For capturing the second image after reading out of the electric charges produced in CMOS image sensor 30 by the preceding image frame, controller 21 adjusts the focus if necessary by driving the focus lens, and immediately after that, starts capturing the second image with electronic front curtain PE1 the and mechanical rear curtain (P250) without executing the pre-driving operation. In other words, the pre-driving operation causes a condition of curtain unit 252 for the first image into the same condition as the second image.

In the operation shown in FIGS. 6 and 7, image data is not read out from CMOS image sensor 30 during the pre-driving operation to move blades 252*a* and 252*b* of curtain unit 252 by a small motion in period PT4. Blades 252*a* and 252*b* may close at least a part of aperture 251*c* during the pre-driving operation to block the light passing through aperture 251*c* and reaching image-capturing surface 30*a*.

Figure 8:
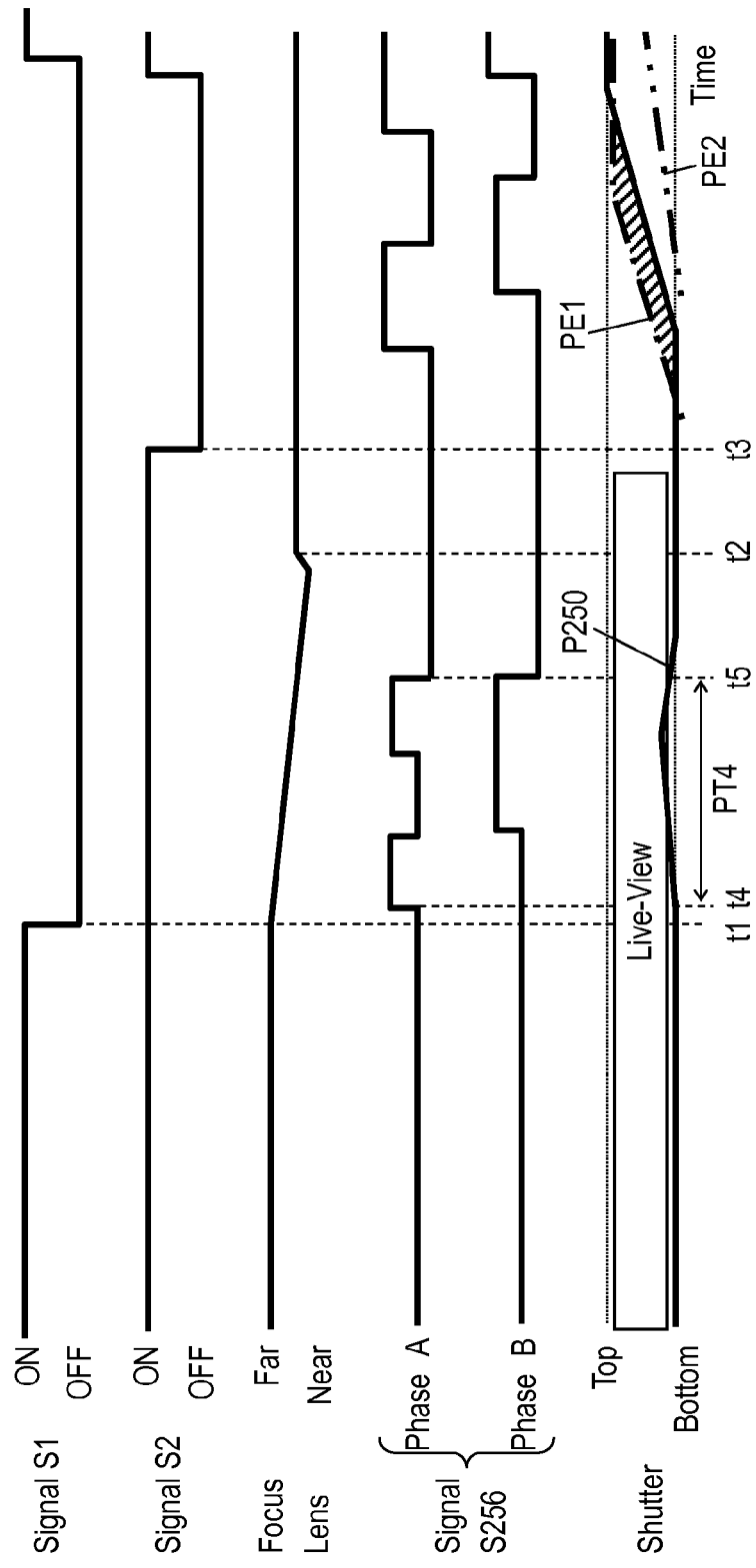
FIG. 8 is a timing chart of another operation with the electronic front curtain and mechanical rear curtain of the camera system according to the embodiment.

FIG. 8 is a timing chart of another image-capturing operation using electronic front curtain and the mechanical rear curtain of camera system 100 according to this embodiment, and similar to FIG. 6, shows signals S1 and S2 output when shutter button 11*a* is activated, the position of focus lens 51*b*, the operation of the shutter, and driving signals S256 supplied to stepping motor 256. The operation shown in FIG. Bis different from the operation shown in FIG. 6 in the timing of period PT4 in which curtain unit 252 moves by a small motion.

Specifically, the period PT4 is allocated after time point t1 when shutter button 11*a* is pressed to the half stroke in the operation shown in FIG. 8 while the period PT4 in the operation shown in FIG. 15 is allocated after time point t3 when shutter button 11*a* is pressed to the full stroke.

When shutter button 11*a* is pressed to the half stroke at time point t1 and outputs signal S1, controller 21 operates similarly to the operation shown in FIG. 6, In the operation shown in FIG. 8, the period PT4 starts before time point t3, a period from time point t3 when shutter button 11*a* is fully pressed to the time when electronic front curtain PE1 actually operates can be shorter than that of the operation shown in FIG. 15. In the operation shown in FIG. 17, the image of the object can be captures within a short time from time point t3 when shutter button 11*a* is fully pressed.

In the operation shown in FIG. 17, the pre-driving operation of driving blades 252*a* and 252*b* of curtain unit 252 by the small motion is executed in the period PT4 while controller 21 captures a live-view image to allow the focus actuator to move focus lens 51*b* and focus on the object. Controller 21 outputs signals S256 to stepping motor 256 to drive stepping motor 256 as to cause blades 252*a* and 252*b* not to block the light passing through aperture 251*c* completely and reaching image-capturing surface 30*a* during the period PT4, thus driving curtain unit 252 by the small motion without influencing the focusing operation of moving focus lens 51*b* from time point t1 to time point t2. Alternatively, controller 21 may output signals S256 to stepping motor 256 to drive stepping motor 256 neither to expose blades 252*a* and 252*b* from aperture 251*c*, nor to cover any part of aperture 251*c* during the period PT4, so that controller 21 can drive curtain unit 252 by the small motion without influencing upon the focusing operation of moving focus lens 51*b* between time point t1 and time point t2.

As described above, controller 21 is operable to control shutter unit 252 to execute the pre-driving operation between a time for obtaining a certain frame of the image data and a time for obtaining a further frame of the image data.

Figure 9:
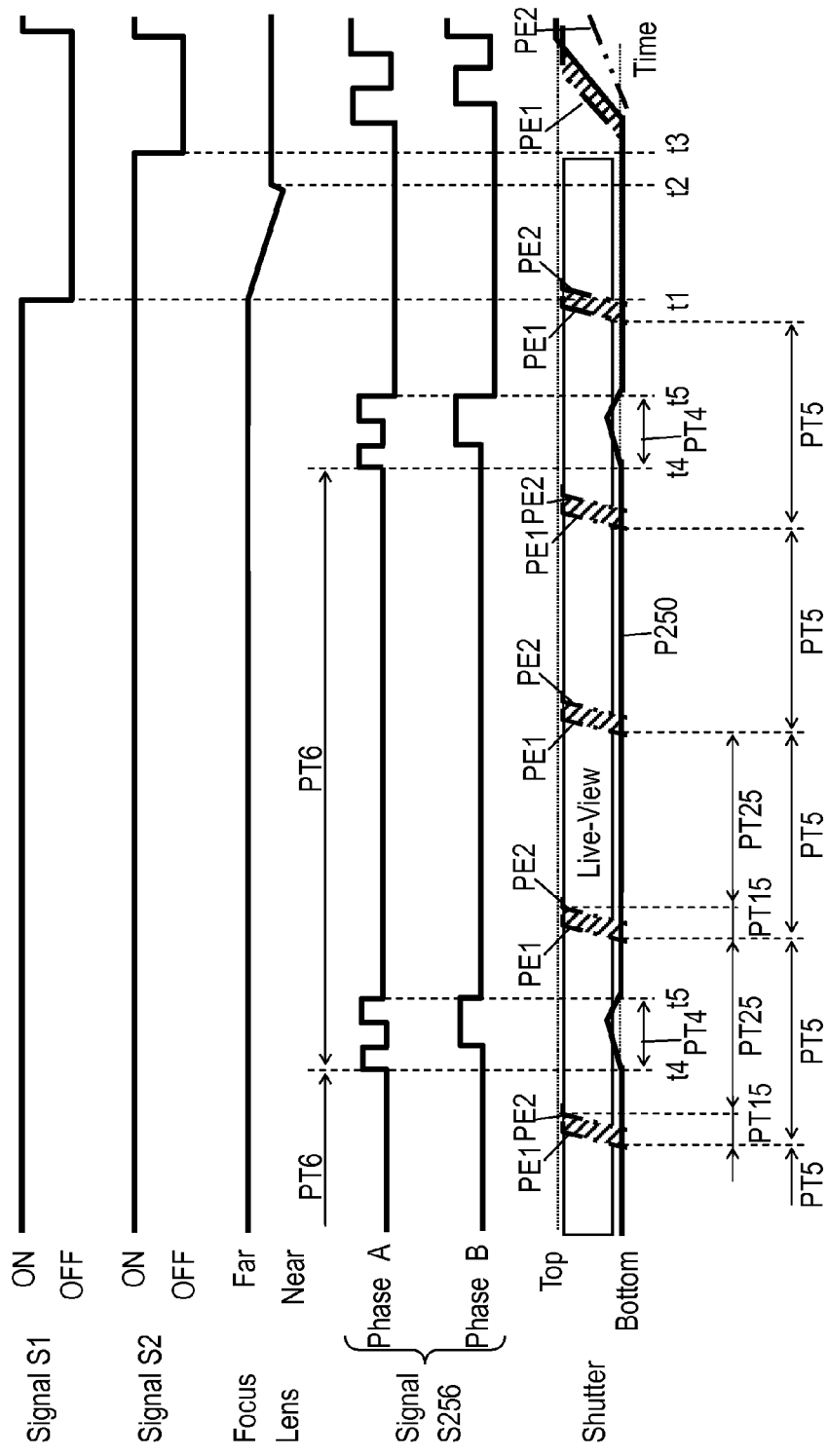
FIG. 9 is a timing chart of still another operation with the electronic front curtain and the mechanical rear curtain of the camera system according to the embodiment.

FIG. 9 is a timing chart of still another image-capturing operation with the electronic front curtain and the mechanical rear curtain of camera system 100 according to this embodiment, and similarly to FIGS. 9 and 8, shows signals S1 and S2 output when shutter button 11*a* is activated, the position of focus lens 51*b*, the operation of the shutter, and driving signals S256 supplied to stepping motor 256. The operation shown in FIG. 18 is different from the operation shown in FIGS. 7 and 8 in the timing of period PT4 in which curtain unit 252 moves by a small motion.

To be specific, the period PT4 in the operation shown in FIG. 9 is allocated within the duration in which the live-view image is displayed while the period PT4 in the operation shown in FIGS. 6 and 8 is allocated after time point t1 when shutter button 11*a* is pressed at least by the half stroke.

As discussed above, CMOS image sensor 30 executes the electronic shutter operation of the rolling shutter with electronic front curtain PE1 and electronic rear curtain PE2 at predetermined intervals PT5 (e.g. 1/10 sec) while the live-view image is displayed. The speed of resetting electric charges with electronic front curtain PE1 and the speed of reading electric charges with electronic rear curtain PE2 while the live-view image is displayed are larger than those during the exposure for capturing the image of the object.

The period PT5 of the electronic shutter operation of the rolling shutter of CMOS image sensor 30 for controller 21 to display the live-view image consists of periods PT15 PT25. Period PT15 starts from the start of accumulation of electric charges in CMOS image sensor 30 until reading of the electric charges. During period PT25 data of the image based on the read-out electric charges is retained. In the operation shown in FIG. 9, the period PT4 driving curtain unit 252 by the small motion of the pre-driving operation is allocated within period PT25. In other words, controller 21 inputs signals S256, i.e., pulse signals, to energize stepping motor 256 such that stepping motor 256 does not rotate completely during the period PT25. The pulse signals input to stepping motor 256 activates curtain unit 252 by the make small motion in the period PT4 from time point t4 to time point t5 in which blades 252*a* and 252*b* of curtain unit 252 move slightly from the opening position at time point t4 and returns to the opening position at time point t5, thus providing the pre-driving operation. The pre-driving operation can reduce the surface force exerted on curtain unit 252, and facilitate lubrication of the rotary shaft of stepping motor 256 with oil, thereby allowing curtain unit 252 to move smoothly after time point t5. While controller 21 may drive curtain unit 252 by the small motion in the period PT5 of the rolling shutter operation, controller 21 may preferably drive shutter unit 252 by the small motion in period PT6 as to reduce a surface force exerted between blades 252*a* and 252*b* of curtain unit 252 and cover 251, to maintain lubrication of stepping motor 256 with oil, and to maintain a short start-up time of curtain unit 252. In the case that the period PT6 is substantially longer than the period PT5, an increase in power consumption of camera system 100 can be suppressed.

In the operation shown in FIG. 18, the image data is not read out from CMOS image sensor 30 during the pre-driving operation in which blades 252a and 252b of curtain unit 252 move by the small motion in the period PT4. Therefore, blades 252a and 252b can close at least a part of aperture 251c during the pre-driving operation, and block the light passing through aperture 251c and reaching image-capturing surface 30a.

Controller 21 continuously displays the live-view image on display device 13 by obtaining image data repetitively plural times wherein controller 21 reads out electric charges accumulated in CMOS image sensor 30 by the image formed on image-capturing surface 30a after resetting electric charges in CMOS image sensor 30, as stated above. That is, the controller is operable to display the live-view image containing images in real time based on the image data obtained from the image-capturing device. In addition, controller 21 controls mechanical shutter 250 to execute the pre-driving operation such that a user cannot recognize, visually from the live-view image, that aperture 251c is driven by the small motion in the pre-driving operation.

In this case, controller 21 may control mechanical shutter 250 to execute the pre-driving operation between one obtaining of image data and another obtaining of the image data among the plural times of repetitively obtaining the image data.

Alternatively, in this case, controller 21 may output signals S256 to stepping motor 256 to drive stepping motor 256 as to cause blades 252a and 252b not to block at all the light passing through aperture 251c and reaching image-capturing surface 30a during the period PT4 to drive curtain unit 252 by the small motion without influencing the focusing operation of moving focus lens 51b from time point t1 to time point t2. Alternatively, controller 21 may output signals S256 to stepping motor 256 to drive stepping motor 256 neither to expose blades 252a and 252b do from aperture 251c, nor to close any part of aperture 251c during the period PT4, so that controller 21 can drive curtain unit 252 by the small motion without influencing the focusing operation of moving focus lens 51b from time point t1 to time point t2. Thus, controller 21 can execute the pre-driving operation at an arbitrary time while the live-view image is displayed.

While stepping motor 256 according to the embodiment is driven with the two-phase signals of phase-A and phase-B, stepping motor 256 may be driven with 1-2 phase driving or micro-stepping driving. In the case that curtain unit 252 is driven with a DC motor instead of stepping motor 256, controller 21 may provide blades 252a and 252b of curtain unit 252 with vibration by energizing the DC motor only for a short time in the pre-driving operation. In the case that curtain unit 252 is driven with a meter coil instead of stepping motor 256, curtain unit 252 may be provided with vibration by a PWM drive.

As described above, camera system 100, an image-capturing apparatus, includes image-capturing device 30 having image-capturing surface 30a, mechanical shutter 250 having aperture 251c therein configured to allow light from an object to pass through aperture 251c, and controller 21 that controls mechanical shutter 250. Mechanical shutter 250 includes a curtain unit that selectively executes an opening operation of opening aperture 251c and a closing operation of closing aperture 251c and stepping motor 256, an actuator that drives curtain unit 252. Controller 21 is operable to control mechanical shutter 250 to execute: an image-capturing operation in which mechanical shutter 250 executes the closing operation after resetting an electric charge stored in image-capturing device 30; and a pre-driving operation in which stepping motor 256 drives curtain unit 250 with a small motion before executing the image-capturing operation. The light passing though aperture 251c reaches image-capturing surface 30a.

Camera system 100 may have a consecutive image-capturing mode in which the controller executes plural consecutive image-capturing operations including the image-capturing operation. In this case, in the consecutive image-capturing mode, controller 21 controls mechanical shutter 250 to execute: the pre-driving operation before executing a first image-capturing operation out of the plural consecutive image-capturing operations; and not to execute the pre-driving operation while executing the plural consecutive image-capturing operations.

1-5. Effects

In camera system 100 according to this embodiment, a small motion is applied to curtain unit 252 driving curtain unit 252 for exposure. This allows camera system 100 according to this embodiment to capture an image with a proper exposure. Camera system 100 can reduce variations of exposure during a consecutive image-capturing.

Mechanical shutter 250 includes single curtain unit 252 that selectively execute an opening operation for opening aperture 251c and a closing operation for closing aperture 251c.

This configuration simplifies the structure more than a focal-plane shutter having a mechanical front curtain and a mechanical rear curtain. This structure can prevent a distance between body mount 14 and CMOS image sensor 30 from being large even when mechanical shutter 250 is disposed between body mount 14 and CMOS image sensor 30, thereby providing camera body 1 with a small size.

Mechanical shutter 250 includes blades 252a and 252b, driving arm 254 and trailing arm 255 linked to blades 252a and 252b to constitute a link mechanism together with blades 252a and 252b, and stepping motor 256 coupled to driving arm 254.

This structure can provide mechanical shutter 250 with a small size by having blades 252a and 252b driven by stepping motor 256, and provide camera body 1 with a small size.

Mechanical shutter 250 may further include spring 255a for urging the link mechanism in a direction in which blades 252a and 252b are urged to open aperture 251c.

This structure can positions blades 252a and 252b to keep aperture 251c open by spring 255a even when stepping motor 256 is not energized.

Mechanical shutter 250 may further include closing-detection switch 257 for detecting that blades 252a and 252b close aperture 251c.

This structure allows controller 21 to positively detect that blades 252a and 252b close aperture 251c.

Mechanical shutter 250 may further include opening-detection switch 258 for detecting that blades 252a and 252b open aperture 251c.

This structure allows controller 21 to positively detect that blades 252a and 252b open aperture 251c.

Camera body 1 includes CMOS image sensor 30, mechanical shutter 250 disposed in front of CMOS image sensor 30, and flash unit 40 having a main capacitor 43 and casing 44. Mechanical shutter 250 has aperture 251c therein. Mechanical shutter 250 has only one curtain unit 252 that selectively executes an opening operation for opening aperture 251c and a closing operation for closing aperture 251c. In the image-capturing with flashlight emitted from flash unit 40, controller 21 causes flash unit 40 to emit flashlight after resetting electric charges on CMOS image sensor 30. After that, controller 21 closes aperture 251c of mechanical shutter 250 with curtain unit 252, and reads the electric charges accumulated on CMOS image sensor 30.

In this structure, mechanical shutter 250 includes only one curtain unit 252 that selectively executes an opening operation for opening aperture 251c and a closing operation for closing aperture 251c. Mechanical shutter 250 has a simpler structure than a focal-plane shutter having a front curtain and a rear curtain, hence providing camera body 1 with a small size.

CMOS image sensor 30 functions as electronic front curtain PE1 while mechanical shutter 250 functions as a rear curtain. Mechanical shutter 250 is closed after emitting the flashlight, and can block unnecessary light from the object when reading out the electric charges. In other words, camera system 100 according to this embodiment can avoid exposure when the electric charges are read without having a focal-plane shutter including a front curtain and a rear curtain, and can capturing images with the flash light with proper exposure.

Camera body 1 includes CMOS image sensor 30 and mechanical shutter 250 disposed in front of CMOS image sensor 30. Mechanical shutter 250 has aperture 251c therein. Mechanical shutter 250 has only one curtain unit 252 that selectively execute an opening operation for opening aperture 251c and a closing operation for closing aperture 251c. Controller 21 causes CMOS image sensor 30 to capture images with an electronic shutter including electronic front curtain PE1 and rear curtain PE2 with aperture 251c both in an open state and a close state by using curtain unit 252. Controller 21 corrects the image obtained with aperture 251c opened by using another image obtained with aperture 251c closed.

In this structure, mechanical shutter 250 includes only one curtain unit 252 that selectively executes an opening operation for opening aperture 251c and a closing operation for closing aperture 251c. Mechanical shutter 250 has a simplifier structure than a focal-plane shutter having a front curtain and a rear curtain, hence providing camera body 1 with a small size.

Camera system 100 can obtain an image with aperture 251c closed, or so-called dark image, even when the image is captured by CMOS image sensor 30 functioning as an electronic shutter. This allows camera system 100 to achieve high sensibility photography.

OTHER EXEMPLARY EMBODIMENTS

As described, the above exemplary embodiments are presented as typical illustrations of the techniques disclosed in the present application. However, the techniques disclosed herein are not restrictive, and they are applicable to other forms that incorporate modifications, substitutions, additions, omissions, and the like changes where appropriate. It is also quite conceivable to create new embodiments by combining the individual components described in the above embodiments.

The components illustrated in the accompanying drawings and the detailed descriptions include not only the components indispensable for solving the problems, but also other components for the purpose of illustrating the techniques as well as components not essential for solving the problems. Therefore, the unessential components should not be taken directly to recognize as the indispensable components simply because they are described or otherwise listed in the accompanying drawings and the detailed descriptions.

Camera system 100 according to this embodiment may have structures described below.

Although main circuit board 20 is disposed between body mount 14 and CMOS image sensor 30, this is not restrictive. Main circuit board 20 may be disposed at other locations, e.g. behind CMOS image sensor 30 or besides CMOS image sensor 30.

CMOS image sensor 30 is adopted as an image-capturing device, this is not restrictive. A CCD image sensor, for example, may also be used as the image-capturing device.

Camera system 100 represents a camera with interchangeable lenses, but this is not only the case. Camera system 100 may instead be a fixed-lens type camera.

In camera system 100 according to this embodiment, controller 21 is causes mechanical shutter 250 to function as a rear curtain, but mechanical shutter 250 may functioned as a front curtain. In other words, controller 21 may be operable to close aperture 251c with blades 252a and 252b before the start of exposure, and the, to determine starting timing of exposure by opening aperture 251c.

The structure of mechanical shutter 250 may not be necessarily limited to these embodiments. For example, mechanical shutter 250 may have one blade, three blades, or more blades. The blades of mechanical shutter 250 may be driven by a driving source other than stepping motor 256. Blades 252a and 252b are configured to close aperture 251c from lower side to upper side, this is not restrictive. Blades 252a and 252b can be configured to close aperture 251c from the upper side to the lower side, from the left to the right, or from the right to the left.

Figure 10:
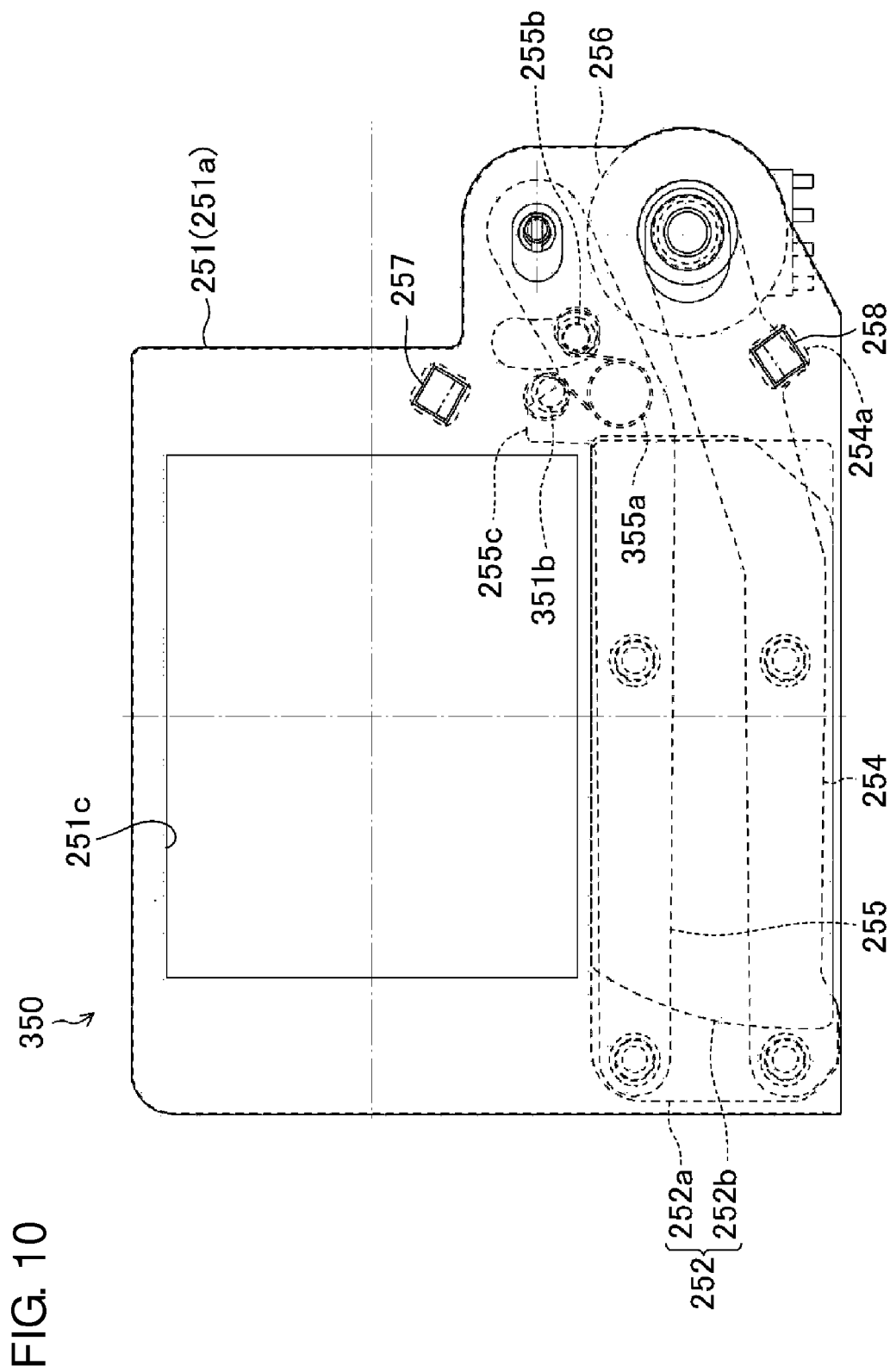
FIG. 10 is a front view of another mechanical shutter of a modified example of the camera system which opens according to the embodiment.
Figure 11:
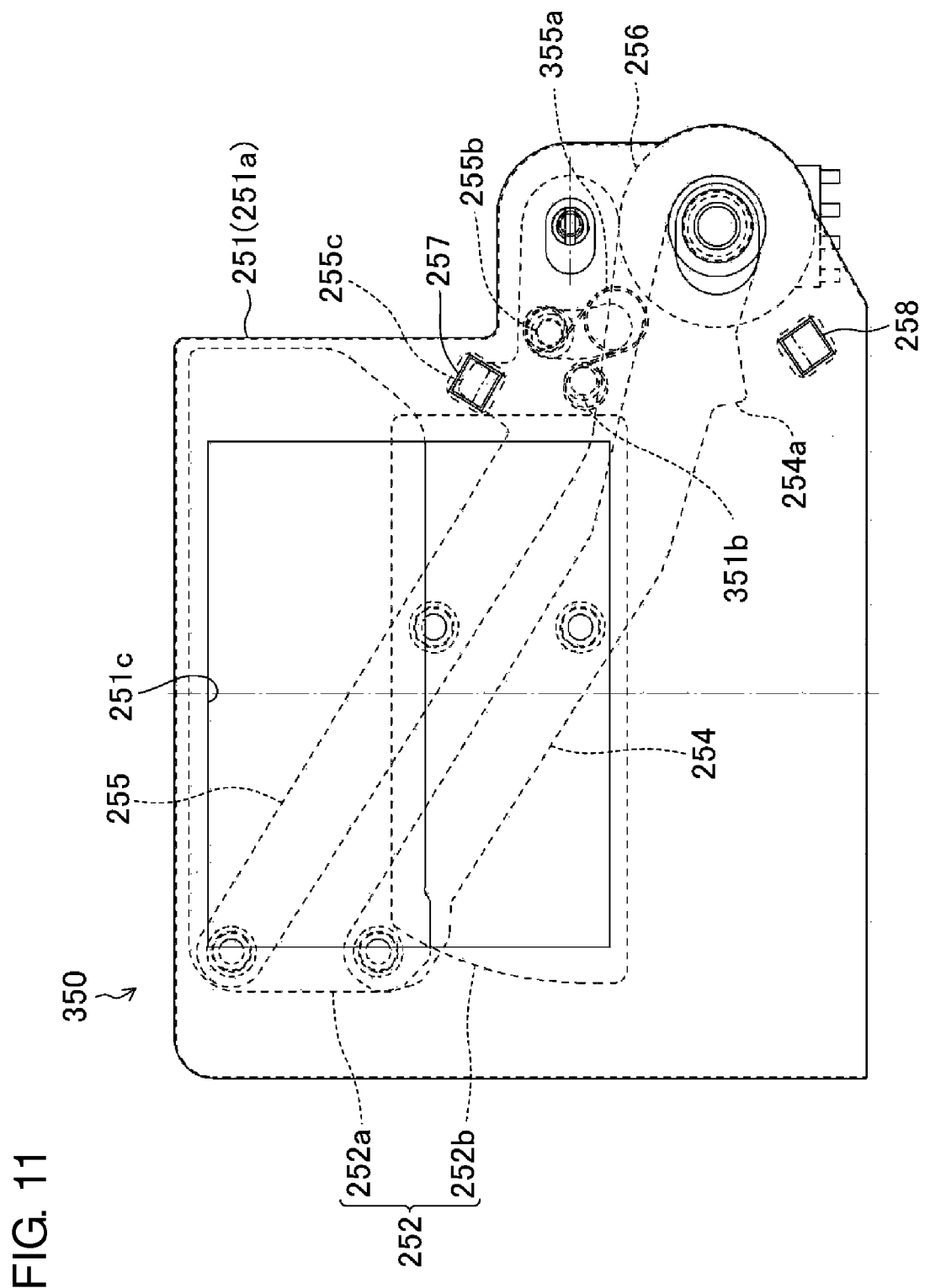
FIG. 11 is a front view of the mechanical shutter shown in FIG. 10 which closes.

FIGS. 10 and 11 are front views of another mechanical shutter 350 according to this embodiment. In FIGS. 10 and 11, components identical to those of mechanical shutter 250 shown in FIGS. 3 to 5 are denoted by the same reference numerals. Mechanical shutter 350 shown in FIGS. 10 and 11 is different from mechanical shutter 250 in the urging of trailing arm 255 and the structure of detecting elements for open and close states of aperture 251c.

Mechanical shutter 350 includes snap-action spring 355a instead of spring 255a. One end of snap-action spring 355a is hooked on catch 351b provided on front cover 251a while another end of snap-action spring 355a is hooked on catch 255b provided on trailing arm 255. Snap-action spring 355a urges the link mechanism in a direction in which blades 252a and 252b are urged to open aperture 251c as well as a direction in which blades 252a and 252b are urged to close aperture 251c. Snap-action spring 355a is the urging member and snap-action urging member. That is, blades 252a and 252b are urged toward the opening position with snap-action spring 355a when stepping motor 256 moves blades 252a and 252b to a position close to the opening position, as shown in FIG. 10. This structure retains blades 252a and 252b at the opening position by snap-action spring 355a, and prevents blades 252a and 252b from moving toward the closing position from the opening position even when stepping motor 256 is not energized. On the other hand, blades 252a and 252b are urged toward the closing position by snap-action spring 355a when stepping motor 256 moves blades 252a and 252b to a position close to the closing position, as shown in FIG. 11. Snap-action spring 355a retains blades 252a and 252b at the closing position, and prevents blades 252a and 252b moving toward the opening position from the closing position even when stepping motor 256 is not energized.

Driving arm 254 has protrusion 254a. Mechanical shutter 350 further includes opening-detection switch 258 disposed at a position where opening-detection switch 258 can detect protrusion 254a when blades 252a and 252b are located at the opening position. On the other hand, trailing arm 255 has protrusion 255c. Mechanical shutter 350 further includes closing-detection switch 257 disposed at a position where closing-detection switch 257 can detect protrusion 255c when blades 252a and 252b are located at the closing position.

Figure 12:
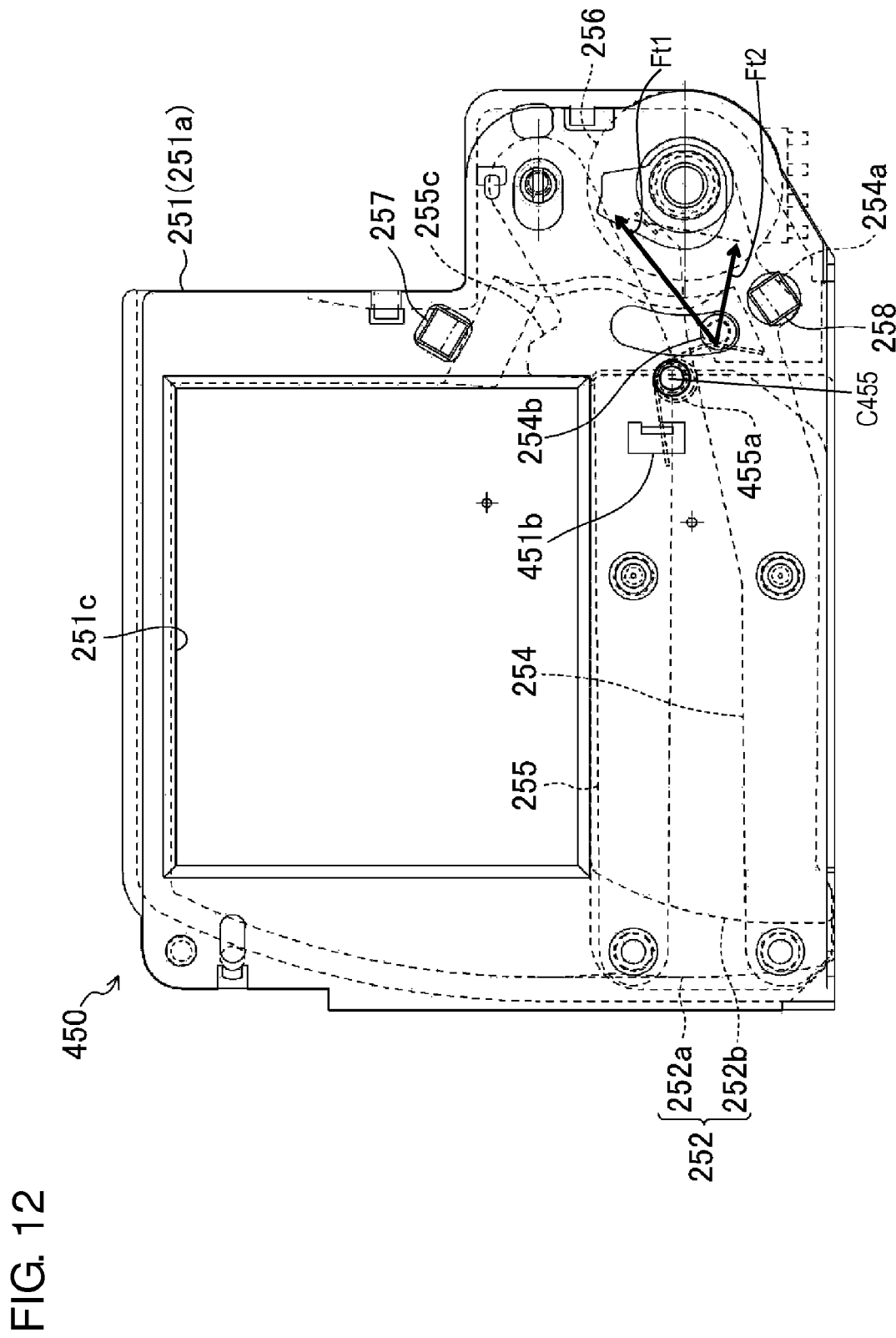
FIG. 12 is a front view of a mechanical shutter of another modified example of the camera system which opens according to the embodiment.
Figure 13:
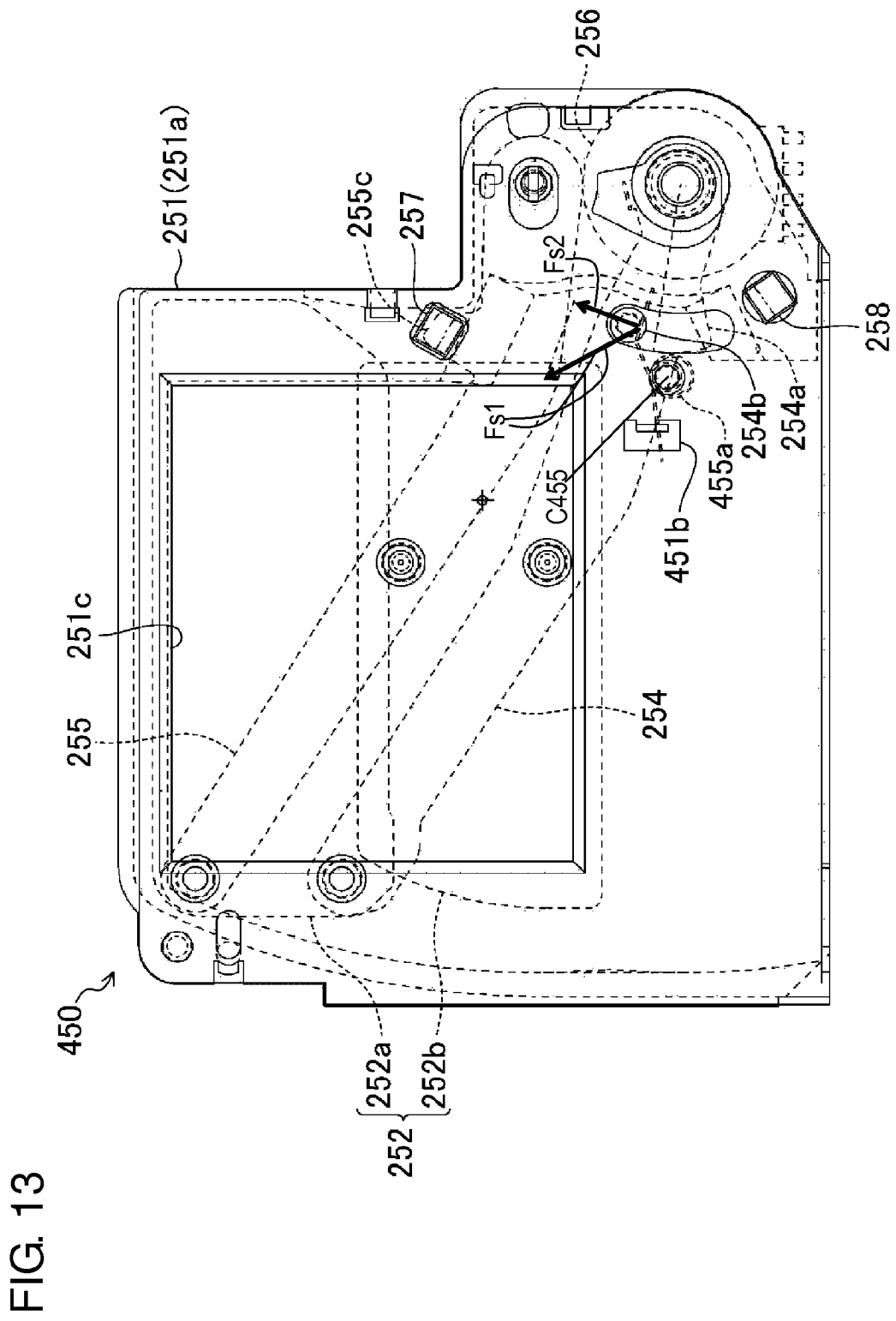
FIG. 13 is a front view of the mechanical shutter shown in FIG. 21 which closes.

FIGS. 12 and 13 are front views of still another mechanical shutter 450 according to this embodiment. In FIGS. 12 and 13, components identical to those of mechanical shutter 350 shown in FIGS. 10 and 11 are denoted by the same reference numerals. Mechanical shutter 450 shown in FIGS. 12 and 13 is different from mechanical shutter 350 in that driving arm 254 is urged by snap-action spring 455a instead of snap-action spring 355a.

Mechanical shutter 450 includes snap-action spring 455a that urges driving arm 254. Snap-action spring 455a has one end hooked on catch 451b provided on front cover 251a, another end hooked on catch 254b provided on driving arm 254, and a middle portion wound about center C455 to have a coil shape between the two ends. Snap-action spring 455a urges the link mechanism in a direction in which blades 252a and 252b are urged to open aperture 251c as well as a direction in which blades 252a and 252b are urged to close aperture 251c. Snap-action spring 455a is the urging member and the snap-action urging member.

When stepping motor 256 moves blades 252a and 252b to a position close to the opening position, as shown in FIG. 12, another end of snap-action spring 455a produces spring force Ft1 in a circumferential direction about center C455. Component Ft2 of spring force Ft1 perpendicular to another end of snap-action spring 455a contacting catch 254b of driving arm 254 is exerted on catch 254b of driving arm 254. CFt2 of spring force Fs1 urges blades 252a and 252b toward the opening position. This structure retains blades 252a and 252b at the opening position by snap-action spring 455a, and prevents blades 252a and 252b from moving toward the closing position from the opening position even when stepping motor 256 is not energized.

On the other hand, when stepping motor 256 moves blades 252a and 252b to a position close to the closing position, as shown in FIG. 13, another end of snap-action spring 455a produces spring force Fs1 in the circumferential direction about center C455. Component Fs2 of spring force Fs1 perpendicular to another end of snap-action spring 455a contacting catch 254b of driving arm 254 is exerted on catch 254b of driving arm 254. Component Fs2 of spring force Fs1 urges blades 252a and 252b toward the closing position. Snap-action spring 455a retains blades 252a and 252b at the closing position, and prevents blades 252a and 252b from moving toward the opening position from the closing position even when stepping motor 256 is not energized.

Driving arm 254 has protrusion 254a. Mechanical shutter 450 further includes opening-detection switch 258 disposed at a position where opening-detection switch 258 can detect protrusion 254a when blades 252a and 252b are positioned at the opening position. On the other hand, trailing arm 255 has protrusion 255c. Mechanical shutter 450 further includes closing-detection switch 257 disposed at a position where closing-detection switch 257 can detect protrusion 255c when blades 252a and 252b are positioned at the closing position.

The techniques disclosed herein are useful for image-capturing apparatuses. The techniques are therefore applicable to digital still cameras used mainly for capturing still images, and camcorders used mainly for capturing moving images.

REFERENCE SIGNS LIST 1 camera body
5 interchangeable lens
5a optical axis
11 exterior cover
11a shutter button
11b control button
12 battery
13 display device
14 body mount
15 body-side contact
20 main circuit board
21 controller
25 circular opening
30 CMOS image sensor
30a image-capturing surface (light-receiving surface)
31 CMOS circuit board
40 flash unit
43 main capacitor
44 casing
51 lens group
51a zoom lens
51b focus lens
51c image stabilization lens
52 lens controller
54 lens-side contact
100 camera system
250 mechanical shutter
251 cover
251a front cover
251b rear cover
251c aperture
252 curtain unit
252a blades
252b blades
254 driving arm
254a protrusion
254b catch
255 trailing arm
255a spring
255c protrusion
256 stepping motor
257 closing-detection switch
258 opening-detection switch
350 mechanical shutter
351b catch
355a snap-action spring
450 mechanical shutter
451b catch
455a snap-action spring

What is claimed is:
1. An image-capturing apparatus comprising:
an image-capturing device having an image-capturing surface;
a shutter unit having an aperture therein, the aperture being configured to allow light from an object to pass through the aperture; and
a controller that controls the shutter unit,
wherein the shutter unit includes:
a curtain unit that selectively executes an opening operation of opening the aperture and a closing operation of closing the aperture; and
an actuator that drives the curtain unit, and
wherein the controller is operable to control the shutter unit to execute:

an image-capturing operation in which the shutter unit executes the closing operation after resetting an electric charge stored in the image-capturing device; and a pre-driving operation in which the actuator drives the curtain unit with a small motion, in which the curtain unit moves from a first position to a second position and back to the first position, before executing the image-capturing operation.

2. The image-capturing apparatus according to claim 1, wherein the image-capturing apparatus has a consecutive image-capturing mode in which the controller executes a plurality of consecutive image-capturing operations including the image-capturing operation, and wherein, in the consecutive image-capturing mode, the controller is operable to control the shutter unit:
to execute the pre-driving operation before executing a first image-capturing operation out of the plurality of consecutive image-capturing operations; and
not to execute the pre-driving operation while executing the plurality of consecutive image-capturing operations.

3. The image-capturing apparatus according to claim 1, wherein the controller is operable to:
display a live-view image containing images in real time based on image data obtained from the image-capturing device; and
control the shutter unit to carry out the pre-driving operation such that a user is not able to recognize visually from the live-view image that the aperture is driven to make small motion in the pre-driving operation.

4. The image-capturing apparatus according to claim 3, wherein the controller is operable to control the shutter unit to execute the pre-driving operation between a time for obtaining a certain frame of the image data and a time for obtaining a further frame of the image data.

5. The image-capturing apparatus according to claim 1, wherein the curtain unit includes a blade configured to open and close the aperture, and wherein the actuator drives the blade such that the blade does not block the light passing through the aperture completely when the shutter unit executes the pre-driving operation.

6. The image-capturing apparatus according to claim 5, wherein the actuator drives the blade such that the blade does not cover any part of the aperture when the shutter unit executes the pre-driving operation.

7. The image-capturing apparatus according to claim 1, wherein, in the pre-driving operation, the actuator drives the entire curtain unit with a simultaneous small motion before executing the image-capturing operation.

8. The image-capturing apparatus according to claim 7, wherein the curtain unit includes a first and second blade.

9. The image-capturing apparatus according to claim 1, wherein the controller is further operable to control the shutter unit to execute a pause operation between the pre-driving operation and the image-capturing operation in which the actuator does not drive the curtain unit.

* * * * *